United States Patent
Herz et al.

(10) Patent No.: US 6,563,419 B1
(45) Date of Patent: May 13, 2003

(54) CONTROL AND DATA TRANSMISSION SYSTEM

(75) Inventors: Manfred Herz, Mainz (DE); Frank Irmer, Mainz (DE); Ralf Burkard, Heidenrod (DE)

(73) Assignee: IC-Haus GmbH (DE)

( * ) Notice: Subject to any disclaimer, the term of this patent is extended or adjusted under 35 U.S.C. 154(b) by 0 days.

(21) Appl. No.: 09/889,114

(22) PCT Filed: Jan. 12, 2000

(86) PCT No.: PCT/DE00/00083
§ 371 (c)(1),
(2), (4) Date: Nov. 13, 2001

(87) PCT Pub. No.: WO00/41460
PCT Pub. Date: Jul. 20, 2000

(30) Foreign Application Priority Data

Jan. 12, 1999 (DE) .......................................... 199 00 869

(51) Int. Cl.[7] ............................................. H04M 11/04
(52) U.S. Cl. .......................... 340/310.01; 340/310.02; 340/310.03; 340/825.62
(58) Field of Search ................... 340/310.01, 310.02, 340/310.03, 825.62, 825.06

(56) References Cited

U.S. PATENT DOCUMENTS

| | | | | |
|---|---|---|---|---|
| 4,507,793 A | | 3/1985 | Adams | |
| 4,929,941 A | * | 5/1990 | Lecocq | 340/825.14 |
| 5,081,440 A | * | 1/1992 | Ott et al. | 340/310 |
| 5,412,369 A | * | 5/1995 | Kirchner | 340/310.03 |
| 5,589,813 A | | 12/1996 | Nielsen | |

FOREIGN PATENT DOCUMENTS

| | | |
|---|---|---|
| DE | 44 12 921 C2 | 10/1995 |
| DE | 44 12 921 A1 | 10/1995 |
| WO | WO 96/04735 | 2/1996 |

\* cited by examiner

*Primary Examiner*—Daniel J. Wu
*Assistant Examiner*—Hung Nguyen
(74) *Attorney, Agent, or Firm*—Edward Dreyfus

(57) ABSTRACT

The invention is based on the object of making available a control and data transmission system which uses simple components to permit current-modulated data transmission via a serial bus, and whose components can be used in a flexible way. For this purpose, the control and data transmission system (50) has a controllable bus terminating device (30) for impressing a predetermined working current into the bus (42, 44). Each subscriber (1, 2) has a D.C.-coupled transmitter (60) for generating and emitting control signals and data signals which modulate the working current, and a D.C.-coupled receiver (20) for sensing and evaluating the working current which is modulated by the control signals and data signals.

11 Claims, 1 Drawing Sheet

CONTROL AND DATA TRANSMISSION SYSTEM

BACKGROUND OF THE INVENTION

The invention relates to a control and data transmission system, in particular for use in a motor vehicle, as claimed in the preamble of claim 1.

At present, numerous bus systems are known in which a multiplicity of subscribers are arranged in series in a serial bus. The data is transmitted from a main device, which is referred to as the bus master, via the bus to all the subscribers which are connected, and then back again to the bus master. The bus subscribers include, for example, sensors and actuators which can transmit and receive data and control signals via the bus. In such bus systems, the data is transmitted either by a voltage modulation or by means of an inductively coupled current modulation of the carrier signal, it being possible with the latter to achieve better EMC characteristics of the bus system in comparison to voltage-modulated data transmission if, for example, a twisted line pair is used as bus. Such a bus system is known, for example, from DE-PS 44 12 921.

SUMMARY OF THE INVENTION

The invention is based on the object of providing a control and data transmission system with a serial bus in which the data and control signals to be transmitted are current-modulated and whose components permit simple and flexible installation.

The invention solves this technical problem with the features of claim 1.

To do this, the control and data transmission system has, in addition to a bus which comprises at least one working current loop, a plurality of subscribers and a D.C. voltage source, a controllable bus terminating device which impresses a predetermined, essentially constant working current into the loop-shaped, serial bus. Therefore, the controllable bus terminating device serves to maintain an essentially constant working current in the bus during the operating state of the control and data transmission system in that it can compensate, for example, temperature-induced and aging-induced current fluctuations of the subscribers connected into the bus. The subscribers which can be connected into the bus each have a D.C.-coupled transmitter for generating and emitting control signals and data signals which modulate the working current, and a D.C.-coupled receiver for sensing and evaluating the working current which is modulated by the control signals and data signals. Any desired transmission protocols and data formats can be used to transmit the data and control signals. For example, a specific subscriber can selectively transmit a message to a selected subscriber by virtue of the fact that the data block to be transmitted contains both the destination address and the source address. The message can then be read only by the destination subscriber whose destination address is contained in the data block.

Advantageous developments are given in the subclaims.

In order to increase the flexibility of the control and data transmission system and to facilitate its installation, each transmitter has at least one controlled power source, and the receiver has an ammeter. In addition, the receiver ensures that if there is a potential difference between the input and output of a corresponding subscriber, said difference is kept essentially constant. At this point it is to be noted that the potential difference is expediently the same in all the connected subscribers; however, this is not necessary. Each subscriber is also designed in such a way that it can be switched between transmit mode and receive mode. The switching over between transmit mode and receive mode is carried out, for example, by connecting the transmitter into the bus in the transmit mode, and the receiver into the bus in the receive mode.

Because the working current which is to be modulated flows through all the subscribers, data transmission can take place both in the forward direction and in the reverse direction via the bus given an appropriate dimensioning of the controllable bus terminating device.

The flexibility of the control and data transmission system can also be increased by virtue of the fact that at least one subscriber is capable of serving as a master, that is to say can transmit not only user data but also control data to the other subscribers.

Installation of the control and data transmission system can be simplified by virtue of the fact that each subscriber has a D.C. voltage supply source and/or a controllable bus terminating device. In this way, it is possible to avoid the use of a separate D.C. voltage source and/or of a separate controllable bus terminating device. Each subscriber instead contains all the components themselves which are necessary for forming a functional control and data transmission system. The subscribers can in addition be manufactured as cost-effective, standardized components by virtue of the fact that they are each composed of at least one, preferably identical integrated circuit. With such implemented subscribers it is possible to disconnect the working current loop of the bus downstream of any of the subscribers without the bus losing its structure, and thus its functional capability up to the point of interruption. This capability is achieved by means of the controllable bus terminating device which is integrated in each subscriber. If the bus is a two-wire line, the bus terminating device of the subscriber which is located in front of the interruption point closes the working current loop in the bus.

The bus expediently comprises a two-wire line in the form of a ring line or spur line.

So that it is ensured that the controllable bus terminating device compensates only relatively slow interference fluctuations in comparison to the data transmission rate, a sufficiently long time constant in comparison to the data transmission rate or bit length is to be selected.

In order to avoid additional lines for supplying power to the individual subscribers, power is also supplied via the bus.

The efficiency of the control and data transmission system is increased by virtue of the fact that the system can configure itself after being put into service or after an interruption, in particular of the bus.

DESCRIPTION OF THE DRAWING

The invention will be explained in more detail below with reference to an exemplary embodiment in conjunction with the appended FIG. 1 which is a schematic representation of such embodiment.

DETAILED DESCRIPTION OF INVENTION EMBODIMENT

Figure 1:
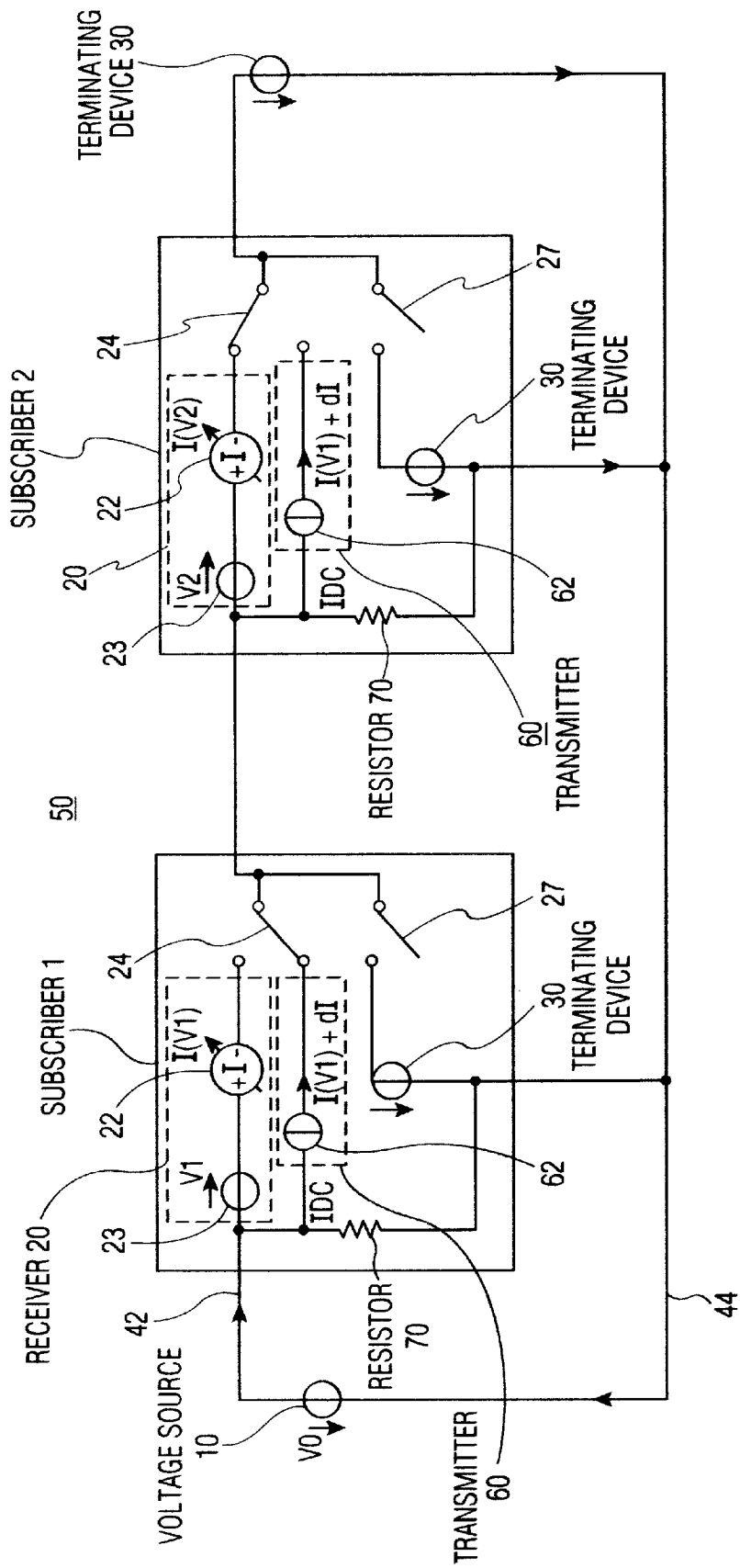

The figure illustrates a control and data transmission system 50 which can be installed in a motor vehicle, for example. Of course, other fields of application, for example in automation systems, are also conceivable. The control and data transmission system 50 comprises a serial bus with a working current loop, 42, 44 which is a two-wire spur line 42, 44 in the present example. A power supply source 10, referred to below for short as D.C. voltage source, which supplies a D.C. voltage $V_0$ (for example 20 V) is connected to the left-hand bus end. The D.C. voltage source 10 is followed by a first subscriber 1 to which a second subscriber 2 is connected in series. For the sake of a simple method of representation, the control and data transmission system 50 comprises only two subscribers 1 and 2 which are connected in series. Connected to the right-hand end of the bus 40 is a controllable bus terminating device 30 whose essential function is to impress a predetermined, essentially constant working current into the bus. As illustrated in the figure, only the conductor 42 of the bus is connected through the subscribers 1 and 2 and the controllable bus terminating device 30. The conductor 44 serves as a grounding line or return line to the D.C. voltage source 10.

Each subscriber 1 and 2 has a D.C.-coupled receiver 20 which in turn contains an ammeter 22 which can be connected to an evaluation logic circuit (not illustrated). The threshold value or values for error-free detection of current-modulated data can be set precisely at the ammeter 22 because the controllable bus terminating device 30 ensures a defined working D.C. current in the bus 42, 44. The receiver 20 is also designed in such a way that an essentially constant potential difference is applied between the input and output of each subscriber 1 and 2. This potential difference is represented symbolically by the voltage source 23 in the receiver 20. It is to be noted that the essentially constant potential difference which is set between the input and output of each subscriber may be the same (for example 0.3 V), but does not have to be the same. In addition, each subscriber 1 and 2 has a D.C.-coupled transmitter 60 with a controlled power source 62. Depending on the embodiment, the transmitter 60 can also contain a plurality of controlled power sources in order to generate a digital or analog data current. The power source 62 is designed in such a way that the data and/or control signals to be transmitted are current-modulated in the transmit mode. The current can be modulated by virtue of the fact that the working current which flows in the bus 42, 44 is varied by a predetermined D.C. absolute value dI with the rhythm of the data to be transmitted. Each subscriber 1 and 2 has, for example, a switch 24 which, depending on the operating state of the subscribers, connects either the transmitter 60 or the receiver 20 into the conductor 42 of the bus.

Because, in the present example, the subscribers 1 and 2 are also supplied with power via the bus 42, 44, a load resistor 70, which is connected between the two conductors 42 and 44 of the bus 40, is provided symbolically in each subscriber 1 and 2. The current flowing through the subscribers 1 and 2 via the conductor 42 is therefore reduced by the intrinsic current flowing through the load resistor 70 of the subscriber 1 and by the intrinsic current flowing through the load resistor 70 of the subscriber 2.

Each subscriber 1 and 2 can also have its own controllable bus terminating device 30 which can be connected into the circuit. In this way it is possible for the bus 42, 44 to be interrupted between each connected subscriber without the structure and functional capability of the bus 42, 44 being adversely affected up to the point of interruption. A further switch 27 is used to connect the bus terminating device 30 of the respective subscriber into the bus 42, 44 if the bus is interrupted downstream of the corresponding subscriber. The subscribers downstream of the point of interruption can also be connected again into a functionally capable bus in which a new working current loop is formed. To do this, all that is necessary is to activate the D.C. voltage source which is arranged downstream of the point of interruption and which can be implemented in the first subscriber after the point of interruption. If the bus is designed as a ring feeder, after the bus is interrupted each subscriber can continue to exchange data with all the other connected subscribers. To do this, the subscribers upstream and downstream of the point of interruption must close the bus by means of the integrated bus terminating device, and in each case a D.C. voltage source must be activated at the start of the bus, as a result of which two functionally capable buses are generated as spur lines. As a consequence, the direction of data transmission is reversed in one of the spur lines. In this case it is important for the subscribers to be of symmetrical design with respect to their connection terminals which conduct working current.

So that the controllable bus terminating device 30 cannot only filter out undesired current fluctuations which are caused, for example, by temperature-induced and aging-induced influences on the subscribers, and cannot filter out the current-modulated data signals and control signals, said bus terminating device 30 is to be dimensioned in such a way that the switching-induced time constant is sufficiently long in comparison with the bit length of the data to be transmitted. The time constant is, for example, several milliseconds, while the bit length can be several microseconds. Although it is not shown in the FIGURE, each subscriber 1 and 2 can contain in particular a microprocessor for controlling the switches 24 and 27 and the controllable power source 62, data signal sources and control signal sources, data signal stores and control signal stores and the like.

In the control and data transmission system 50 illustrated in the figure, the subscriber 1 operates in transmit mode; this is because the transmitter 60 is connected into the conductor 42 of the bus via the switch 24. In contrast, the subscriber 2 operates in receive mode. In this case, the receiver 20 is connected into the conductor 42 of the bus via the switch 24. The ammeter 22 of the receiver 20 is configured in such a way that it can sense the current-modulated data coming from the subscriber 1 and can feed it to an evaluation device (not illustrated) for further processing.

According to a further embodiment, each subscriber 1 and 2 can have its own D.C. voltage source 10 so that to completely form the control and data transmission system 50, in addition to the bus 42, 44, it is only necessary to connect the necessary number of subscribers to the bus 42, 44. A separate D.C. voltage source 10 and a controllable bus terminating device 30 are then no longer necessary. In addition, each subscriber can function as a bus master. Once a subscriber has been selected as bus master, all the other subscribers operate as what is referred to as slave subscribers.

What is claimed is:

1. A control and data transmission system, in particular for motor vehicles, having the following features:
   a serial bus (42, 44) for transmitting control signals and data signals,
   a plurality of subscribers (1, 2) which can be connected in series into the bus (42, 44) and
   a D.C. voltage supply source (10), characterized by a controllable bus terminating device (30) for impressing a predetermined substantially constant working current into the bus (42, 44), each subscriber (1, 2) having;

a D.C.-coupled transmitter (60, 62) for generating and emitting control signals and data signals which modulate the working current, and a D.C.-coupled receiver (20, 22, 23) for sensing and evaluating the working current which is modulated by the control signals and data signals.

2. The control and data transmission system as claimed in claim 1, wherein the transmitter (60) contains at least one controlled power source (62), wherein the receiver (20) contains an ammeter (22) and supplies an essentially constant potential difference (23) between the input and output of the subscriber, and wherein each subscriber (1, 2) can be switched between transmit mode and receive mode.

3. The control and data transmission system as claimed in claim 1 or 2, wherein at least one subscriber is capable of serving as a master.

4. The control and data transmission system as claimed in one of claims 1 or 2, wherein the subscribers can transmit data signals and/or control signals in both directions via the bus (42, 44).

5. The control and data transmission system as claimed in one of claims 1 to 2, wherein each subscriber (1, 2) has a D.C. voltage supply source (10) and/or a controllable bus terminating device (30).

6. The control and data transmission system as claimed in claim 5, wherein each subscriber includes at least one integrated circuit.

7. The control and data transmission system according to claim 1, wherein the bus terminating device (30) has a time constant longer than the bit length of the control signals and data signals to be transmitted.

8. The control and data transmission system according to claim 1, wherein the power is supplied to the subscribers (1, 2) via the bus (42, 44).

9. The control and data transmission system according to claim 1, wherein each subscriber is of symmetrical design with respect to its connection devices which conduct the working current.

10. The control and data transmission system according to claim 1, wherein the bus comprises a two-wire line (42, 44) in the form of a ring line or spur line.

11. The control and data transmission system according to claim 5, wherein said control and data transmission system can configure itself by switching to its respective voltage supply source and controllable bus terminating device in response to degraded circuit parameters or circuit interruption including bus interruption.

* * * * *